United States Patent
Elliot et al.

(10) Patent No.: US 7,496,785 B2
(45) Date of Patent: Feb. 24, 2009

(54) ENCLOSURE-BASED RAID PARITY ASSIST

(75) Inventors: John C. Elliot, Tucson, AZ (US);
Robert A. Kubo, Tucson, AZ (US);
Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 11/386,066

(22) Filed: Mar. 21, 2006

(65) Prior Publication Data
US 2007/0245173 A1 Oct. 18, 2007

(51) Int. Cl.
*G06F 11/00* (2006.01)
(52) U.S. Cl. .................. 714/6; 714/5; 711/114
(58) Field of Classification Search ............ 714/5, 714/6; 719/325
See application file for complete search history.

(56) References Cited

U.S. PATENT DOCUMENTS

| | | | |
|---|---|---|---|
| 5,191,584 A * | 3/1993 | Anderson ................. | 714/6 |
| 5,307,464 A | 4/1994 | Akao et al. | |
| 5,446,908 A | 8/1995 | Kevorkian | |
| 5,774,693 A | 6/1998 | Hsu et al. | |
| 5,937,428 A * | 8/1999 | Jantz ..................... | 711/114 |
| 6,079,017 A | 6/2000 | Han et al. | |
| 6,128,762 A * | 10/2000 | Jadav et al. ............. | 714/766 |
| 6,233,702 B1 | 5/2001 | Horst et al. | |
| 6,272,662 B1 * | 8/2001 | Jadav et al. ............. | 714/805 |
| 6,401,170 B1 | 6/2002 | Griffith et al. | |
| 6,446,237 B1 * | 9/2002 | Menon .................... | 714/800 |
| 6,496,940 B1 | 12/2002 | Horst et al. | |
| 6,671,782 B1 * | 12/2003 | Menon .................... | 711/145 |
| 6,701,452 B1 * | 3/2004 | Kinjo et al. .............. | 714/6 |
| 7,007,193 B1 * | 2/2006 | Fuld ...................... | 714/6 |
| 7,143,305 B2 * | 11/2006 | Hajji et al. .............. | 714/2 |

(Continued)

FOREIGN PATENT DOCUMENTS

JP PUPA04-253235 9/1992

(Continued)

OTHER PUBLICATIONS

Menon, Jai; Riegel, Jeff; Wyllie, Jim. Algorithms for Software and Low-cost Hardware Raids. Mar. 1995. Compcon '95. 'Technologies for the Information Superhighway', Digest of Papers. p. 417.*

*Primary Examiner*—Scott T. Baderman
*Assistant Examiner*—Paul F. Contino
(74) *Attorney, Agent, or Firm*—Dan Shifrin

(57) ABSTRACT

In a RAID storage system, a parity value is generated. The storage system includes a RAID adapter, a plurality of disk array processors managing corresponding sets of RAID storage drives, and a connecting fabric. The RAID adapter initiates a parity generation operation, parallel instructions are dispatched for the array processors to each generate a partial parity value from data blocks on drives on respective managed RAID storage drives, the partial parity value is received in the RAID adapter from each array processor, and the partial parity values are combined in the RAID adapter to generate a complete parity value. The parity value may be an actual parity block to be stored on a hard disk drive or may be a reconstructed data block in the event of a failed drive.

18 Claims, 3 Drawing Sheets

U.S. PATENT DOCUMENTS

| | | | |
|---|---|---|---|
| 7,308,602 B2 * | 12/2007 | Dandrea | 714/6 |
| 2003/0046497 A1 * | 3/2003 | Dandrea | 711/154 |
| 2005/0050384 A1 * | 3/2005 | Horn | 714/6 |

FOREIGN PATENT DOCUMENTS

| | | | |
|---|---|---|---|
| JP | PUPA06-044116 | 2/1994 | |
| JP | PUPA06-250902 | 9/1994 | |
| JP | 07-129414 | 5/1995 | |

* cited by examiner

ENCLOSURE-BASED RAID PARITY ASSIST

RELATED APPLICATION DATA

The present application is related to commonly-assigned and co-pending U.S. application Ser. No. 11/385,388, entitled ISOLATING A DRIVE FROM DISK ARRAY FOR DIAGNOSTIC OPERATIONS, and U.S. application Ser. No. 11/386,025, entitled OFFLOADING DISK-RELATED TASKS FROM RAID ADAPTER TO DISTRIBUTED SERVICE PROCESSORS IN SWITCHED DRIVE CONNECTION NETWORK ENCLOSURE, both filed on the filing date hereof and both of which are incorporated herein by reference in their entireties.

TECHNICAL FIELD

The present invention relates generally to RAID storage systems and, in particular, to managing parity generation within such a system.

BACKGROUND ART

Generation of a parity value in a RAID storage system is both processor intensive and bandwidth intensive. For example, a large RAID system may include a redundant pair of RAID adapters or controllers, multiple pairs of redundant disk array switches, an equal number of sets of hard disk drives (HDDs) and an equal number of sub-processors. The components are interconnected through a "fabric": the adapters are interconnected with a first pair of switches, the first pair of switches are interconnected with a second pair, and so forth in a daisy chain fashion. Each sub-processor is coupled to a pair of switches and each set of HDDs is likewise coupled to a pair of switches. In order for an instruction to be transmitted from an adapter to a switch, it must be pass through any of the upstream fabric and switches. Similarly, data must be passed upstream through any switches to the adapter.

The conventional process of generating a parity value requires a substantial use of adapter resources and fabric bandwidth. The RAID adapter performs an exclusive-OR (XOR) on blocks of data across a group of HDDs to generate a parity block: $A_p = A_1 + A_2 + \ldots + A_n$, where $A_p$ is the parity block and '+' represents an XOR operation. For example, in a typical RAID level 5 array to generate the data block parity for a group that consists of six data-containing HDDs plus a parity HDD, the adapter must perform six read operations, generate the parity value, and one write operation to store the parity onto the seventh HDD. Additionally, when a write is to be made of data which does not span all of the drives in a group, either reads of the data blocks on the drives must be made or the prior data and prior parity are needed in order to generate the new parity block. All of these operations consume adapter resources and produce traffic across the fabric. Resource consumption is even greater when rebuilding a failed drive. Again, the adapter reads data blocks and the parity block from the other drives, applies the parity block to the data block and recreates the missing data blocks. While a fast rebuild time is important to return the storage system to the required level of redundancy, it comes at the cost of decreased system performance as the adapter is less able to perform other functions.

Consequently, a need remains for efficient parity generation and drive rebuild operations which require fewer adapter resources and less fabric bandwidth.

SUMMARY OF THE INVENTION

The present invention provides a method for generating a parity value in a RAID storage system. The storage system includes a RAID adapter, a plurality of disk array processors managing corresponding sets of RAID storage drives, and a connecting fabric. The method includes initiating a parity generation operation by the RAID adapter, dispatching parallel instructions for the array processors to each generate a partial parity value from data blocks on drives on respective managed RAID storage drives, receiving the partial parity value in the RAID adapter from each array processor, and combining the partial parity values in the RAID adapter to generate a complete parity value. The parity value may be an actual parity block to be stored on a hard disk drive or may be a reconstructed data block in the event of a failed drive.

The present invention also provides a RAID storage adapter and a RAID storage system including a RAID storage adapter. The adapter includes a fabric interface coupled to a plurality of disk array switches, each disk array switch controlling a respective group of RAID disks and coupled to an associated array processor, means for initiating a parity generation function, means for dispatching instructions through the switches to the associated array processors directing each array processor to generate a partial parity value from data blocks on disks in the respective group of disks, means for receiving the generated partial parity values from the array processors, and a parity generator configured to combine the received partial parity values into a complete parity value.

The present invention further includes a computer program product of a computer readable medium usable with a programmable computer, the computer program product having computer-readable code embodied therein for generating a parity value in a RAID storage system, the storage system having a RAID adapter, a plurality of disk array processors managing corresponding sets of RAID storage drives, and a connecting fabric. The computer-readable code includes instructions for initiating a parity generation operation by the RAID adapter, dispatching parallel instructions for the array processors to each generate a partial parity value from data blocks on drives on respective managed RAID storage drives, receiving the partial parity value in the RAID adapter from each array processor, and combining the partial parity values in the RAID adapter to generate a complete parity value.

DETAILED DESCRIPTION OF THE PREFERRED EMBODIMENT

Figure 1:
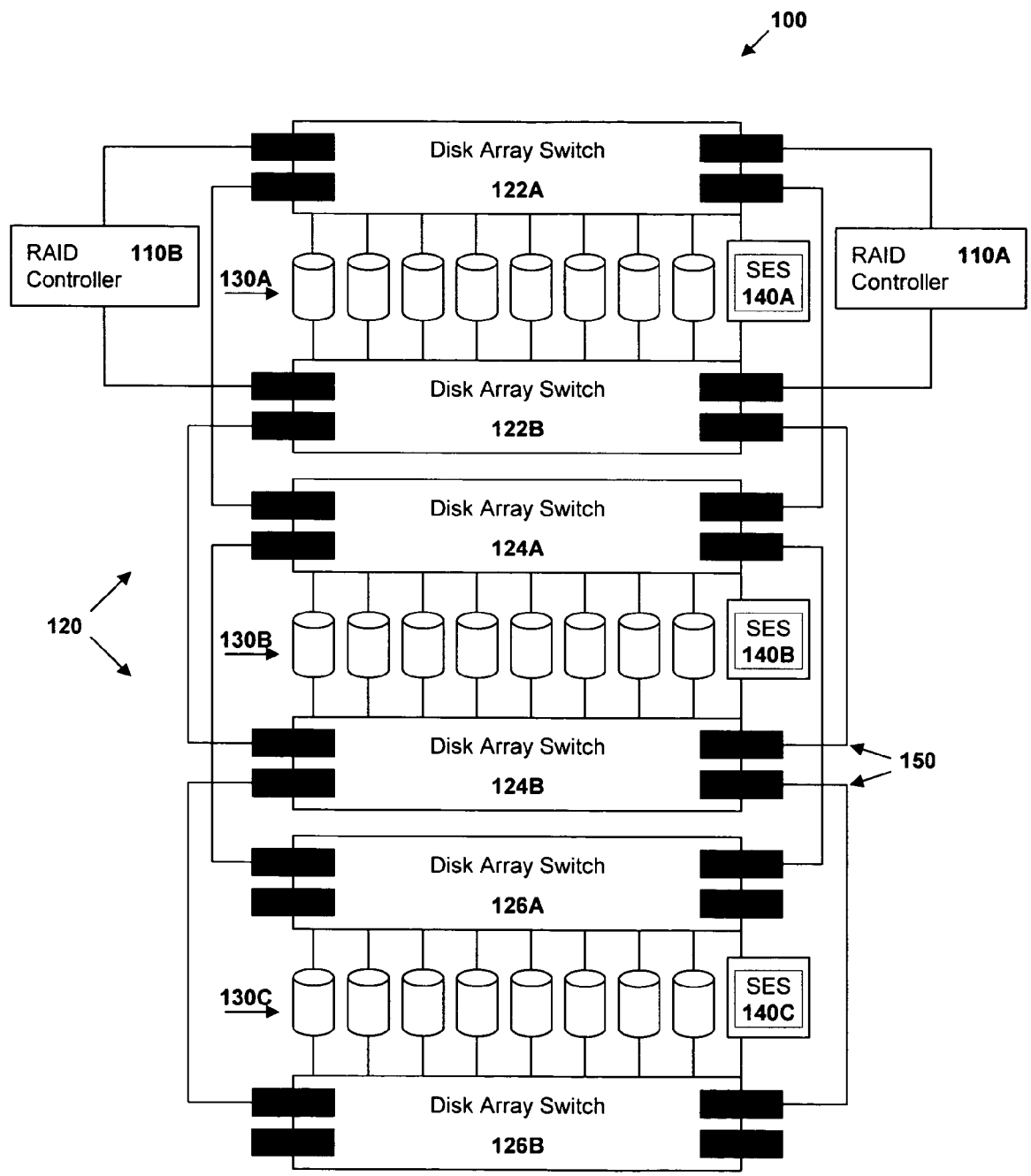
FIG. 1 is a block diagram of a RAID storage system in which the present invention may be implemented.

FIG. 1 is a block diagram of a RAID storage system 100 in which the present invention may be implemented. The system 100 includes a redundant pair of RAID adapters or controllers 110A, 110B (collectively referred to as 110) which are coupled to one or more servers. The system 100 further includes redundant pairs of disk array switches 120, three pairs of which 122A and 122B, 124A and 124B, and 126A and 126B, are shown in the Figure. The system 100 also includes sets of hard disk drives (HDDs) 130A, 130B, 130C (collectively referred to as 130), each set being associated with a pair of switches. The system 100 also includes a service processor 140A, 140B, 140C associated with each pair of switches 120 (and collectively referred to as 140). Typically, a pair of switches 120, a set of HDDs 130 and a service processor 140 will be housed in an enclosure (not shown). In the system 100 illustrated, the service processors 140 are SCSI Enclosure Service (SES) processors which manage switch functions and the enclosure environment.

The RAID adapters 110A and 110B are each coupled to redundant ports of both of a first set of switches 122A and 122B through a communications network or fabric 150. The first set of switches 122A and 122B are in turn coupled to redundant ports of both of a second set of switches 124A and 124B through the fabric 150. And, second set of switches 124A and 124B are in turn coupled to redundant ports of both of the third set of switches 126A and 126B through the fabric 150. Thus, any communications between an adapter 110 and a switch or HDD in the third enclosure passes through the first and second sets of switches.

Figure 2:
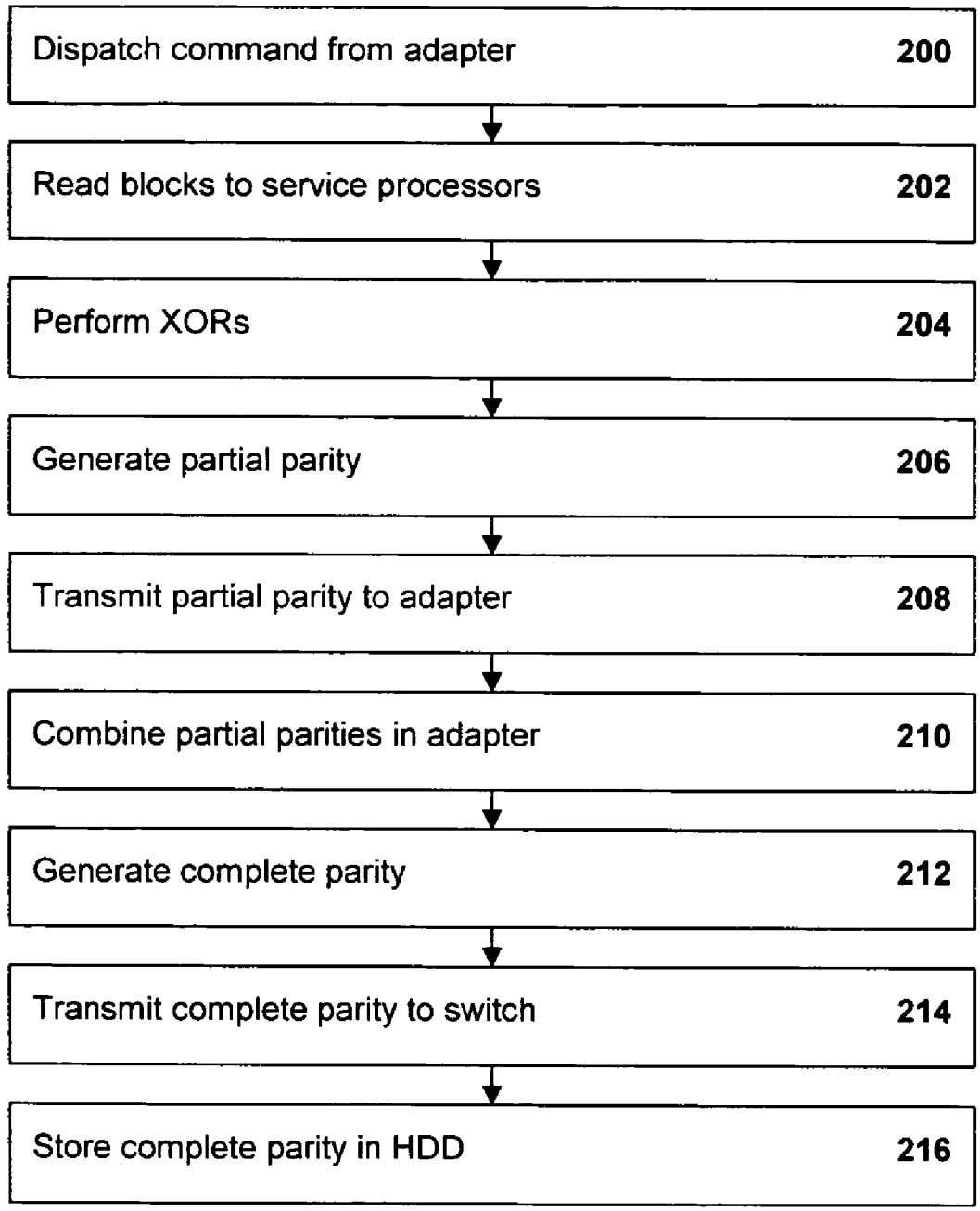
FIG. 2 is flowchart of a method of the present invention.

Referring to the flowchart of FIG. 2, when parity is be generated, the RAID adapter 110 dispatches a command (step 200) to the service processors 140 to perform an XOR on specified data blocks and return the results to the adapter 110. The service processors 140 read the specified data blocks from the associated HDDs 130 (step 202) and then each performs an XOR operation (step 204) to generate a parity value for the specified data blocks (step 206). The parity values, each of which is a partial parity value for the entire group, are transmitted back to the adapter 110 (step 208). The adapter 110 combines the partial parity values by performing an XOR operation (step 210) to generate a complete parity block (step 212). The complete parity block is then transmitted to a designated switch 120 (step 214) to be stored in a specified HDD 130 (step 216). Thus, instead of six separate read operations and one write operation by the adapter 110, the equivalent of only two reads (receiving the partial parity values form the service processors 140) and one write are required of the adapter, a significant savings in adapter resources and fabric bandwidth.

Figure 3:
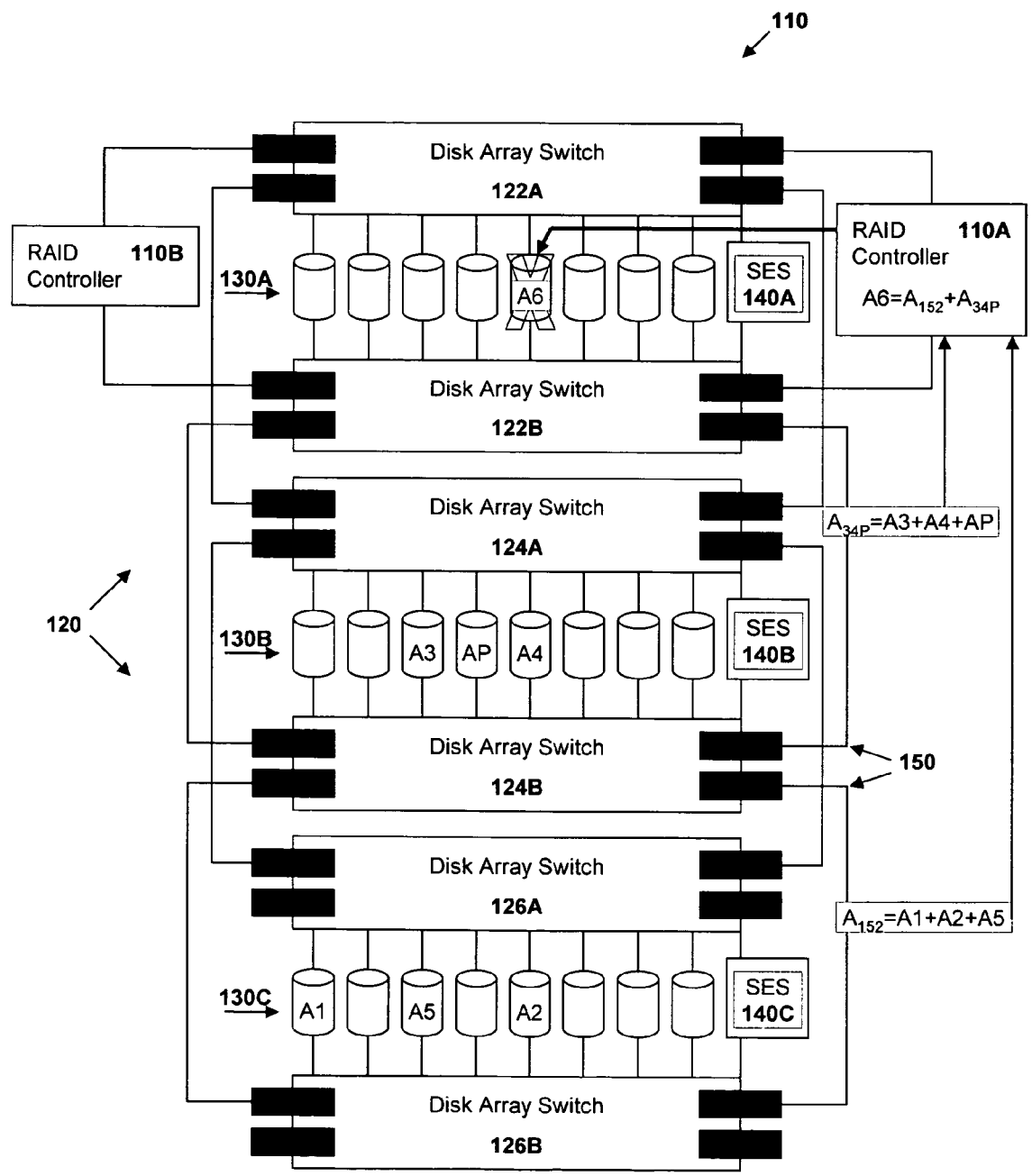
FIG. 3 is a block diagram of the RAID storage system illustrating the process of rebuilding data from a failed drive.

Rebuilding data from a failed drive is a similar procedure. The block diagram of FIG. 3 assumes that HDDs A1, A2 and A5 in the third enclosure (managed by the third service processor 140C and switches 126A, 126B), HDDs in the second enclosure A3 and A4 (managed by the second service processor 140B and switches 124A, 124B), and HDD A6 in the first enclosure (managed by first service processor 140A and switches 122A, 122B), and parity drive $A_p$, also in the second enclosure, comprises a drive group. If drive A6 has failed, its data must be rebuilt and restored. The RAID adapter 110 dispatches a command to the second and third service processors 140B, 140C in the second and third enclosures to each generate a partial parity value. The second service processor 140B reads data and parity blocks from the HDDs A3, A4 and Ap and performs an XOR operation: $A_{34P}=A_3+A_4+A_p$. Similarly, the third service processor 140C reads data and parity blocks from the HDDs A1, A2 and A5 and performs an XOR operation: $A_{152}=A1_1+A_5+A_2$. The two partial parity values are then transmitted to the RAID adapter 110 which combines them and generates the missing data block A6: $A_6=A_{34P}+A_{152}$. The missing block $A_6$ is then transmitted to a disk array switch 122 in the first enclosure to be written to one of the HDDs to replace the failed HDD. Again, the adapter only performs the equivalent of only two reads (receiving the partial parity values form the service processors 140) and one write are required, a significant savings in adapter resources and fabric bandwidth.

Moreover, due to the adapter 110 and switches 120 operating in a non-blocking mode, the high volume of data movement during the partial parity operation is localized to the switch domain one drive at a time. Thus, while the service processors 140 are performing the partial XOR operations on one drive, the fabric ports to all other drives and those between adjacent enclosures remain available for use by the adapter 110 and switches 120 to perform other tasks.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for generating a parity value in a RAID storage system.

What is claimed is:

1. A method for generating a parity value in a RAID storage system, the storage system having a RAID adapter, a plurality of disk array processors managing corresponding sets of RAID storage drives, and a connecting fabric, the method comprising:
    initiating a parity generation operation by the RAID adapter;
    dispatching parallel instructions for the array processors to each generate a partial parity value from data blocks on drives on respective managed RAID storage drives;
    receiving the partial parity value in the RAID adapter from each array processor; and
    combining the partial parity values in the RAID adapter to generate a complete parity value.

2. The method of claim 1, further comprising transmitting the complete parity value from the RAID adapter to a disk array processor to be written to a storage drive.

3. The method of claim 1, further comprising rebuilding disk data from the complete parity value.

4. The method of claim 1, further comprising executing the instructions by the array processors in a non-blocking manner whereby other operations may continue in the storage system.

5. The method of claim 1, wherein the disk array processors are SCSI enclosure services (SES) processors.

6. A RAID storage adapter, comprising
    a fabric interface coupled to a plurality of disk array switches, each disk array switch controlling a respective group of RAID disks and coupled to an associated array processor;

means for initiating a parity generation function;

means for dispatching parallel instructions through the switches to the associated array processors directing each array processor to generate a partial parity value from data blocks on disks in the respective group of disks;

means for receiving the generated partial parity values from the array processors; and a parity generator configured to combine the received partial parity values into a complete parity value.

7. The RAID adapter of claim 6, wherein the disk array processors are SCSI enclosure services (SES) processors.

8. The RAID adapter of claim 6, further comprising means for dispatching instructions to a select disk array processor to store the complete parity value to a disk.

9. The RAID adapter of claim 6, further comprising means for rebuilding disk data from the complete parity value.

10. A RAID storage system, comprising:

a RAID adapter;

a plurality of disk array switches coupled to the RAID adapter;

a plurality of groups of storage disks, each coupled to a respective one of the disk array switches;

a plurality of service processors, each coupled to a disk array switch;

a partial parity generator associated with each service processor configured, at the request of parallel instructions dispatched by the RAID adapter, to generate a partial parity value from select data blocks and to send the generated partial parity value to the RAID adapter; and a final parity generator associated with the RAID adapter configured to combine the generated partial parity values and generate a complete parity value.

11. The RAID storage system of claim 10, wherein the service processors are SCSI enclosure services (SES) processors.

12. The RAID storage system of claim 10, further comprising means associated with the RAID adapter for dispatching instructions to a select disk array processor to store the complete parity value to a disk.

13. The RAID storage system of claim 10, further comprising means for rebuilding disk data from the complete parity value.

14. A computer program product of a recordable-type computer readable medium usable with a programmable computer, the computer program product having computer-readable code embodied therein for generating a parity value in a RAID storage system, the storage system having a RAID adapter, a plurality of disk array processors managing corresponding sets of RAID storage drives, and a connecting fabric, the computer-readable code comprising instructions for:

initiating a parity generation operation by the RAID adapter;

dispatching parallel instructions for the array processors to each generate a partial parity value from data blocks on drives on respective managed RAID storage drives;

receiving the partial parity value in the RAID adapter from each array processor; and combining the partial parity values in the RAID adapter to generate a complete parity value.

15. The computer program product of claim 14, wherein the computer-readable code further comprises instructions for transmitting the complete parity value from the RAID adapter to a disk array processor to be written to a storage drive.

16. The computer program product of claim 14, wherein the computer-readable code further comprises instructions for rebuilding disk data from the complete parity value.

17. The computer program product of claim 14, wherein the computer-readable code further comprises instructions for executing the instructions by the array processors in a non-blocking manner whereby other operations may continue in the storage system.

18. The computer program product of claim 14, wherein the disk array processors are SCSI enclosure services (SES) processors.

* * * * *